Feb. 16, 1943.    D. W. MAIN ET AL    2,311,239
SELF-SEALING COUPLING
Filed Jan. 6, 1941

Inventors
DONALD W. MAIN and
FRIEDRICH PETER HIRSCH
By Beaman + Langford
Attorney Patented Feb. 16, 1943

2,311,239

UNITED STATES PATENT OFFICE 2,311,239

SELF-SEALING COUPLING

Donald W. Main and Friedrich Peter Hirsch, Jackson, Mich., assignors to Michigan Patents Corporation, Jackson, Mich., a corporation of Michigan Application January 6, 1941, Serial No. 373,292

1 Claim. (Cl. 284—19)

The present invention relates to improvements in couplings of the type shown in United States Patent No. 2,208,286, granted July 16, 1940.

As its primary objects the present invention is concerned with the simplification of construction and improvement in performance of the coupling shown in the aforesaid patent. The construction, arrangement and combination of parts for accomplishing these objects will appear from a consideration of the following description and the annexed claim.

Figure 1:
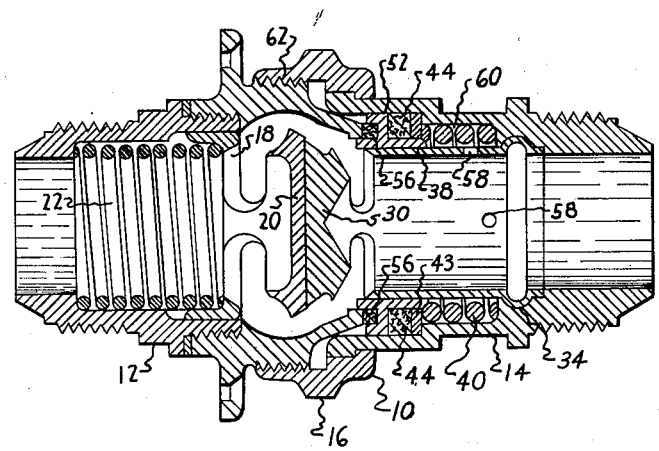
Fig. 1 is a vertical cross-sectional view of the coupling assembled.
Figure 2:
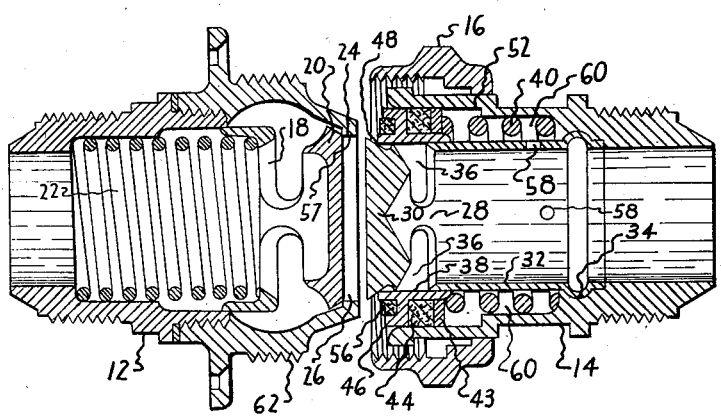
Fig. 2 is a view similar to Fig. 1 with the coupling part separated.

In the illustrated embodiment, the coupling 10 is shown assembled in Fig. 1 and disassembled in Fig. 2. The coupling 10 can be considered as comprising three main parts, body parts 12 and 14, and a connecting nut 16. Supported for axial sliding movement in the body 12 is a valve 18 having a head 20 which is urged by a spring 22 against the seat 24 closing the outlet end 26 of the body 12 when disconnected. The valve 28 in the body part 14 comprises a head 30 supported from a sleeve 32 which is fixed to the body 14 by being rolled in to the groove 34. The passageway for fluid through the body 14 is through openings 36 which are closed off by a sleeve valve 38 when the coupling parts are disconnected. A spring 40 acting through a washer 42 and packing ring 44 against an annular flange 46 upon the sleeve 38 urges the latter against the annular seat 48 of the head 30 to provide a seal.

It will be noted that the annular flange 46 has a sliding fit with the cylindrical bore portion 52 with the shoulder 54 acting as a stop to limit the movement of the sleeve 38 to compress the packing rings 44 and 56, the latter being supported in the flange 46 for engagement by the forward end 57 of the body 12. An aperture 58 in the sleeve 32 enables fluid pressure to enter the chamber 60 to assist the spring 40 in seating the sleeve 38 when the body parts 12 and 14 are disconnected.

As will be seen from a consideration of Fig. 1, when the nut 16 is tightened upon the threaded portion 62 of the body part 12, the forward end 57 engages the packing 56 to slide the sleeve 38 rearwardly compressing the spring 40 to permit fluid to flow through the openings 36. At the same time the head 30 has displaced the head 20 rearward to enable fluid to pass between the head 20 and its seat 24.

The fundamental characteristics of the herein described coupling are the same as that of the coupling of the aforesaid patent and therefore do not have to be stressed herein.

Having described our invention, what we desire to protect by Letters Patent and claim is:

In a coupling of the type described, an outer wall structure having a cylindrical bore, a cylindrical sleeve concentric with and spaced therefrom to form an annular chamber, a valve seat carried by an apertured end of said sleeve, a sleeve valve entirely confined in said chamber and having a cylindrical portion piloted upon said sleeve for axial movement, an annular radial portion upon said sleeve valve closely fitted in said bore, annular sealing means supported upon said sleeve valve upon opposite sides of said radial portion, one of said means constituting an outer main seal and the other a seal between said sleeve valve and said bore, and a spring embracing said sleeve and acting against said sleeve valve to move the same towards said seat.

DONALD W. MAIN.
FRIEDRICH PETER HIRSCH.